US010819183B1

(12) United States Patent
Kothandaraman et al.

(10) Patent No.: US 10,819,183 B1
(45) Date of Patent: Oct. 27, 2020

(54) SPHERICAL VOICE COIL BASED RESOLVER SYSTEM

(71) Applicant: HONEYWELL INTERNATIONAL INC., Morris Plains, NJ (US)

(72) Inventors: Deena Dayalan Kothandaraman, Bangalore (IN); Shouvik Das, Bangalore (IN); Saurabh Agrawal, Bangalore (IN); Renju Chandrasekhara Panicker, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 16/404,952

(22) Filed: May 7, 2019

(51) Int. Cl.
*H02K 7/116* (2006.01)
*H02K 7/08* (2006.01)
*H02K 41/03* (2006.01)
*B25J 17/02* (2006.01)
*G01C 19/04* (2006.01)

(52) U.S. Cl.
CPC .......... *H02K 7/088* (2013.01); *B25J 17/0266* (2013.01); *G01C 19/04* (2013.01); *H02K 41/03* (2013.01); *H02K 2201/18* (2013.01)

(58) Field of Classification Search
CPC .. H02K 7/088; H02K 2201/18; B25J 17/0266
See application file for complete search history.

(56) References Cited

U.S. PATENT DOCUMENTS

| 3,295,379 | A | | 1/1967 | Jensen et al. |
|---|---|---|---|---|
| 4,719,381 | A | * | 1/1988 | Miles .................... H02K 41/02 310/166 |
| 4,739,241 | A | | 4/1988 | Vachtsevanos et al. |
| 5,410,232 | A | | 4/1995 | Lee |
| 6,326,714 | B1 | | 12/2001 | Bandera |
| 8,278,915 | B2 | | 10/2012 | Soo |

(Continued)

FOREIGN PATENT DOCUMENTS

| EP | 3116111 A1 | 6/2016 |
|---|---|---|
| JP | 2004015965 A | 1/2004 |
| RU | 2629691 C1 | 8/2017 |

*Primary Examiner* — Muhammad S Islam
(74) *Attorney, Agent, or Firm* — Lorenz & Kopf, LLP

(57) ABSTRACT

A spherical resolver system includes a spherical body, an outer body, a first sensor coil, a second sensor coil, a third sensor coil, a first primary coil, and a circuit. The spherical body has a first axis of symmetry, a second axis of symmetry, and a third axis of symmetry, and the first, second, and third axes of symmetry are disposed perpendicular to each other. The circuit is coupled to the first primary coil and is operable to supply a first alternating current (AC) reference signal ($V_{r1}$) to the first primary coil, whereby a first sensor signal ($V_x$) is selectively induced in the first sensor coil, second sensor signal ($V_y$) is selectively induced in the second sensor coil, and a third sensor signal ($V_z$) is selectively induced in the third sensor coil, and supplies one or more signals representative of the sensor position.

16 Claims, 12 Drawing Sheets

(56) References Cited

U.S. PATENT DOCUMENTS

| | | |
|---|---|---|
| 2009/0230787 A1 | 9/2009 | Won et al. |
| 2013/0113307 A1 | 5/2013 | Kim et al. |
| 2017/0012482 A1 | 1/2017 | Bandera |
| 2017/0012492 A1* | 1/2017 | Bandera ............... H02K 41/031 |
| 2018/0159412 A1 | 6/2018 | Bandera |

* cited by examiner

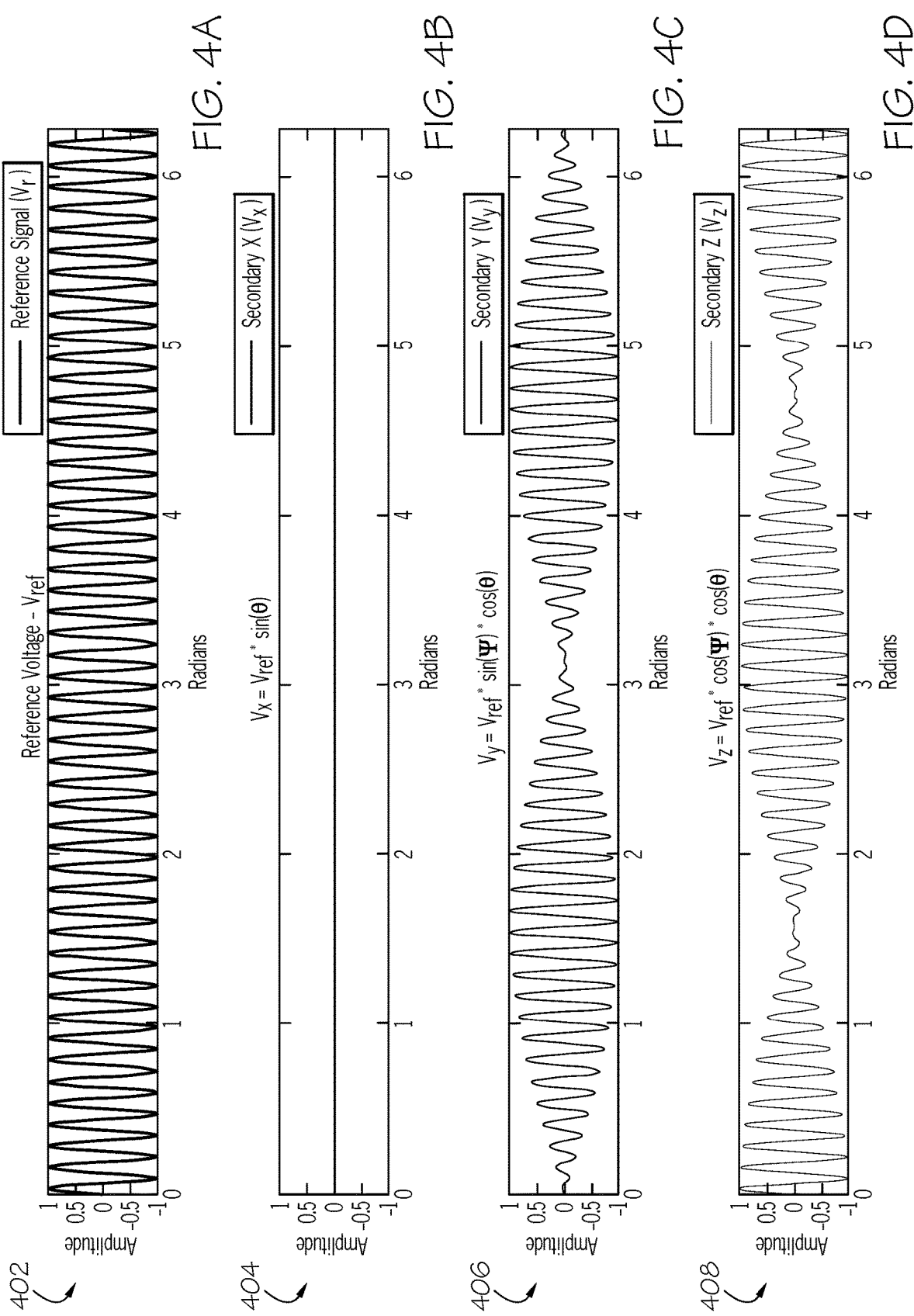

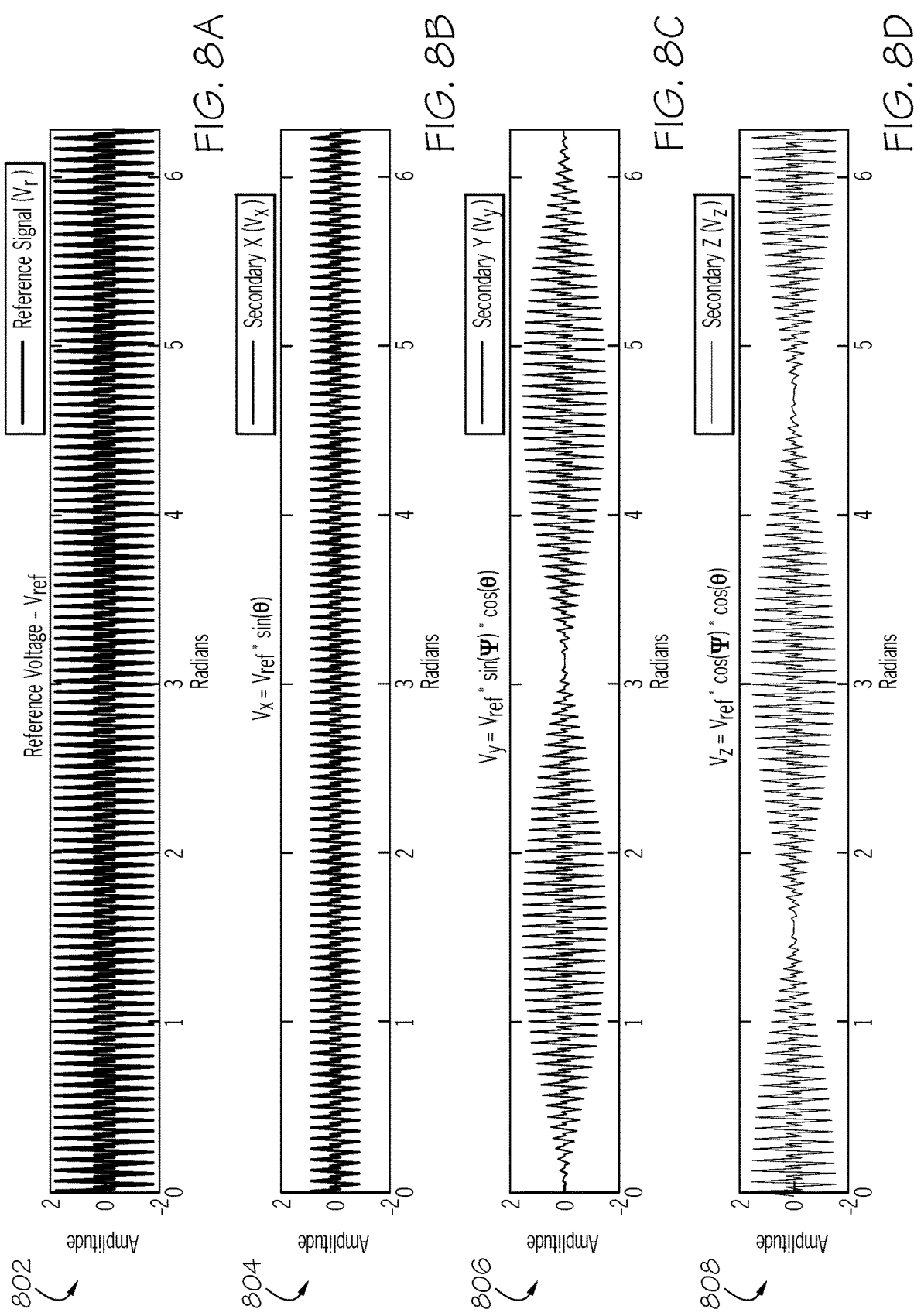

SPHERICAL VOICE COIL BASED RESOLVER SYSTEM

TECHNICAL FIELD

The present invention generally relates to sensors, such as resolvers, and more particularly relates to a spherical voice coil-based resolver system.

BACKGROUND

Many advanced control mechanisms, such as gimbals, robotic arms, flight control sidesticks, rely on relatively high-precision, high-accuracy position sensing devices. Such position sensing devices include optical encoders, potentiometric sensors, resolvers, and linear and rotary differential transformers. In many instances where relatively high-precision, high-accuracy position sensing is needed, resolvers are used. This, in part, is because resolvers are relatively simple, robust, and long lasting and, when needed, can be sized to fit within relatively small space envelopes.

Some of the above-mentioned applications implement simultaneous multi-axis rotational control. For many of these applications, multiple position sensing devices are used, with one sensing device being dedicated to each rotational axis. This can lead to certain drawbacks. For example, it can complicate the mechanical design and the electrical interfaces of the mechanism, which can increase the overall weight and size of the system. An increase in the number of parts (e.g., sensor devices) can also lead to reduction in reliability.

Hence, there is a need for a single position sensing device that can provide multi-axis position sensing, and therefore allow relatively simple, lightweight, and cost effective mechanical and electrical system design, while simultaneously improving system reliability. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a spherical resolver system includes a spherical body, an outer body, a first sensor coil, a second sensor coil, a third sensor coil, a first primary coil, and a circuit. The spherical body has a first axis of symmetry, a second axis of symmetry, and a third axis of symmetry, and the first, second, and third axes of symmetry are disposed perpendicular to each other. The outer body is spaced apart from, and surrounds a portion of, the spherical body, wherein one of the spherical body or the outer body is rotatable, relative to the other, about the first, second, and third axes of symmetry, and is thereby moveable to a sensor position. The first sensor coil is wound on a portion of the spherical body about the first axis of symmetry. The second sensor coil is wound on a portion of the spherical body about the second axis of symmetry. The third sensor coil is wound on a portion of the spherical body about the third axis of symmetry. The first primary coil is wound on the outer body. The circuit is coupled to the first primary coil and is operable to supply a first alternating current (AC) reference signal ($V_{r1}$) to the first primary coil, whereby a first sensor signal ($V_x$) is selectively induced in the first sensor coil, second sensor signal ($V_y$) is selectively induced in the second sensor coil, and a third sensor signal ($V_z$) is selectively induced in the third sensor coil. The circuit is further coupled to receive the selectively induced first, second, and third sensor signals and is configured, upon receipt of the selectively induced first, second, and third sensor signals, to supply one or more signals representative of the sensor position.

In another embodiment, a spherical resolver system includes a spherical body, an outer body, a first sensor coil, a second sensor coil, a third sensor coil, a first primary coil, a gimbal structure, and a circuit. The spherical body has a first axis of symmetry, a second axis of symmetry, and a third axis of symmetry, and the first, second, and third axes of symmetry are disposed perpendicular to each other. The outer body is spaced apart from, and surrounds a portion of, the spherical body, wherein one of the spherical body or the outer body is rotatable, relative to the other, about the first, second, and third axes of symmetry, and is thereby moveable to a sensor position. The first sensor coil is wound on a portion of the spherical body about the first axis of symmetry. The second sensor coil is wound on a portion of the spherical body about the second axis of symmetry. The third sensor coil is wound on a portion of the spherical body about the third axis of symmetry. The first primary coil is wound on the outer body. The gimbal structure is spaced apart from, and surrounds a portion of, the spherical body. The gimbal structure is rotationally coupled to the outer body to allow rotation of the outer body. The circuit is coupled to the first primary coil and is operable to supply a first alternating current (AC) reference signal ($V_{r1}$) to the first primary coil, whereby a first sensor signal ($V_x$) is selectively induced in the first sensor coil, second sensor signal ($V_y$) is selectively induced in the second sensor coil, and a third sensor signal ($V_z$) is selectively induced in the third sensor coil. The circuit is further coupled to receive the selectively induced first, second, and third sensor signals and is configured, upon receipt of the selectively induced first, second, and third sensor signals, to supply one or more signals representative of the sensor position. The first, second, and third axes of symmetry intersect at an origin, and the one of the spherical body or the outer body is moveable to a sensor position having one or both of (i) a polar angle ($\theta$) component relative to the origin and (ii) an azimuthal angle ($\varphi$) component relative to the origin.

Furthermore, other desirable features and characteristics of the spherical resolver system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein:

FIGS. 4A-4D and 5A-5D graphically depict example reference and sensor signals associated with the spherical resolver of FIGS. 1-3;

FIGS. 8A-8D, 9A-9C, and 10A-10C graphically depict example reference and sensor signals associated with the spherical resolver of FIG. 7;

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
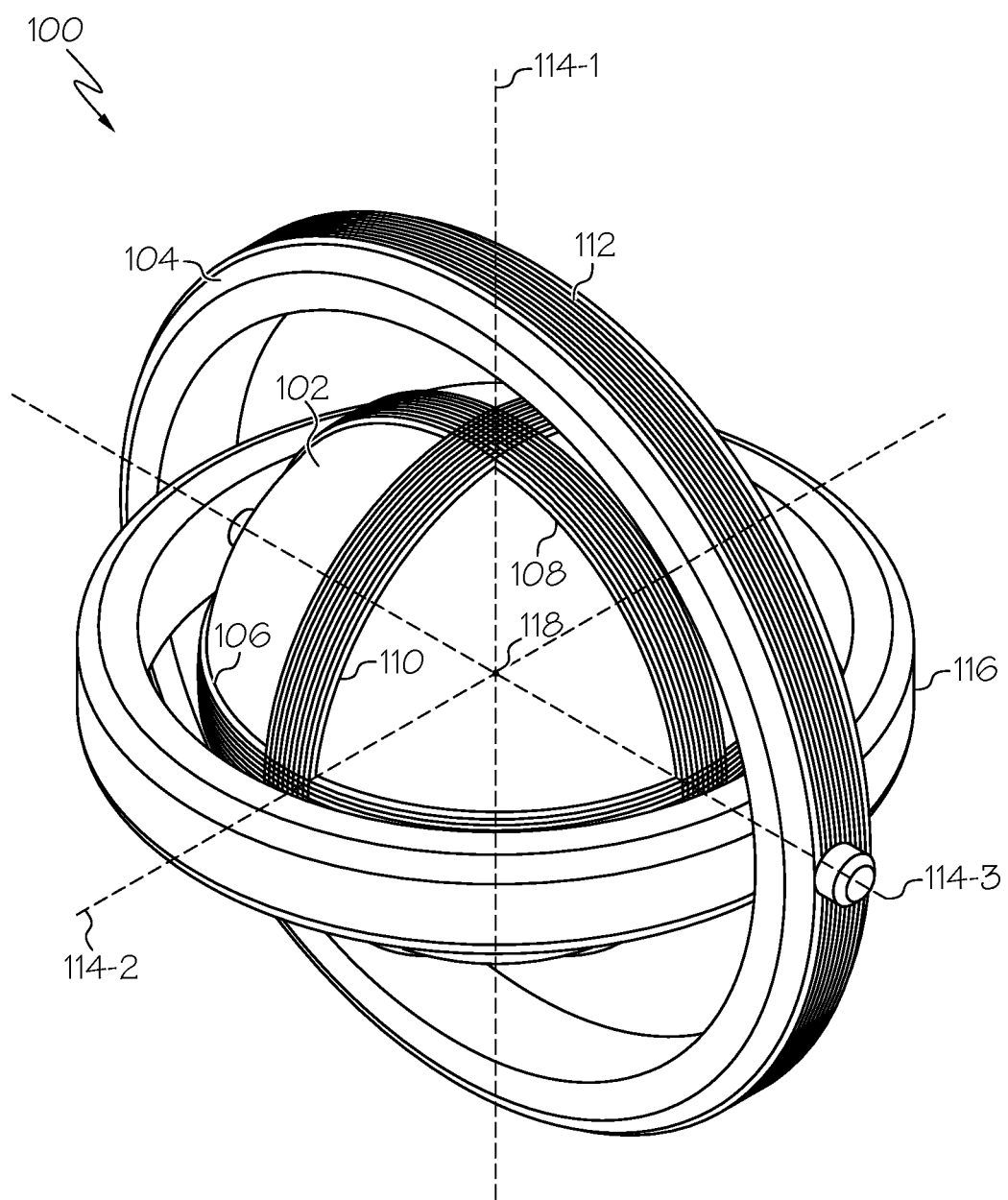
FIG. 1 depicts one embodiment of a spherical resolver.

Referring first to FIG. 1, one embodiment of a spherical resolver 100 is depicted. The depicted spherical resolver 100 includes a spherical body 102, an outer body 104, a first sensor coil 106, a second sensor coil 108, a third sensor coil 110, and a primary coil 112. The spherical body 102 has three axes of symmetry 114—a first axis of symmetry 114-1, a second axis of symmetry 114-2, and a third axis of symmetry 114-3—that are disposed perpendicular to each other.

The outer body 104 is spaced apart from, and surrounds a portion of, the spherical body 102. In the depicted embodiment, the outer body 104 is rotatable, relative to the spherical body 102 about two of the axes of symmetry 114. With the convention used herein, and as will be described further below, the outer body 104 it is rotatable about the first and third axes of symmetry 114-1, 114-3. It will be appreciated that in other embodiments, the spherical body 102 may be configured to be rotatable relative to the outer body 104 about the two axes of symmetry 114. Regardless of which of these components is rotated, it is noted that when it is rotated (or moved) to a particular position, that position is referred to herein as "a sensor position."

To facilitate the relative rotation of the outer body 104, the spherical resolver 100, at least in the depicted embodiment, additionally includes a gimbal structure 116. The gimbal structure may be variously configured, but in the embodiment depicted in FIG. 1, it is spaced apart from, and surrounds a portion of, the spherical body 102, and it rotationally coupled to the outer body 104. In particular, as will be described further below, the is configured to allow rotation of the outer body 104 about one or both of the first and third axes of symmetry 114-1, 114-3.

The sensor coils 106, 108, 110 are each wound on a portion of the spherical body 102 about a different one of the axes of symmetry 114. Specifically, the first sensor coil 106 is wound about the first axis of symmetry 114-1, the second sensor coil 108 is wound about the second axis of symmetry 114-2, and the third sensor coil 110 is wound about the third axis of symmetry 114-3.

The primary coil 112 is wound on the outer body 104 and, as will be described momentarily, is supplied with an alternating current (AC) reference signal ($V_r$). As a result of transformer action (i.e., mutual inductance), and dependent upon the position of the primary coil 112 relative to the first, second, and third sensor coils 106, 108, 110, sensor signals may be induced in one or more of the first, second, and third sensor coils 106, 108, 110. More specifically, a first sensor signal ($V_x$) may be selectively induced in the first sensor coil 106, a second sensor signal ($V_y$) may be induced in the second sensor coil 108, and a third sensor signal ($V_z$) may be induced in the third sensor coil 110.

Figure 2:
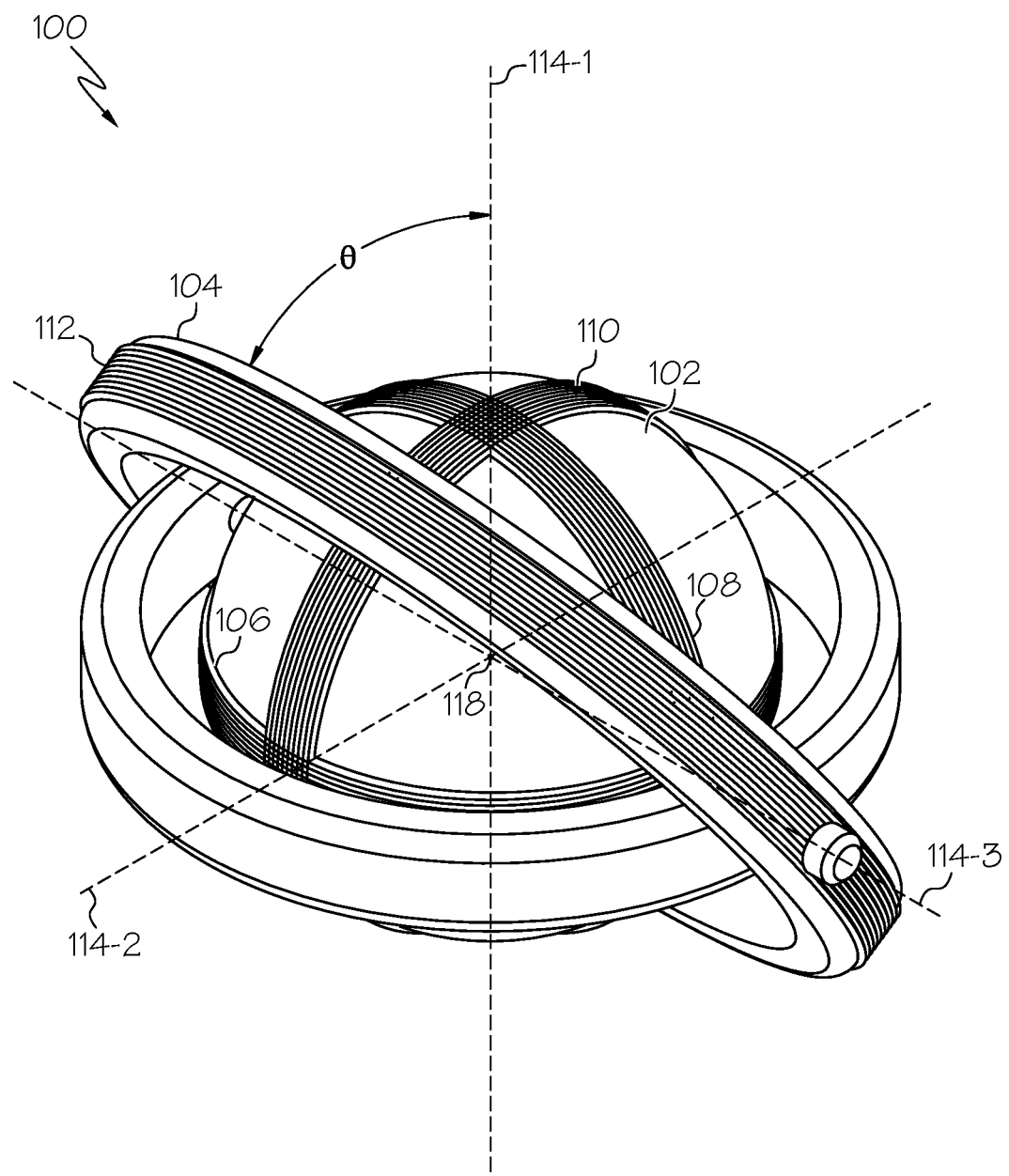
FIGS. 2 and 3 depict the resolver of FIG. 1 in two different sensor positions.
Figure 3:
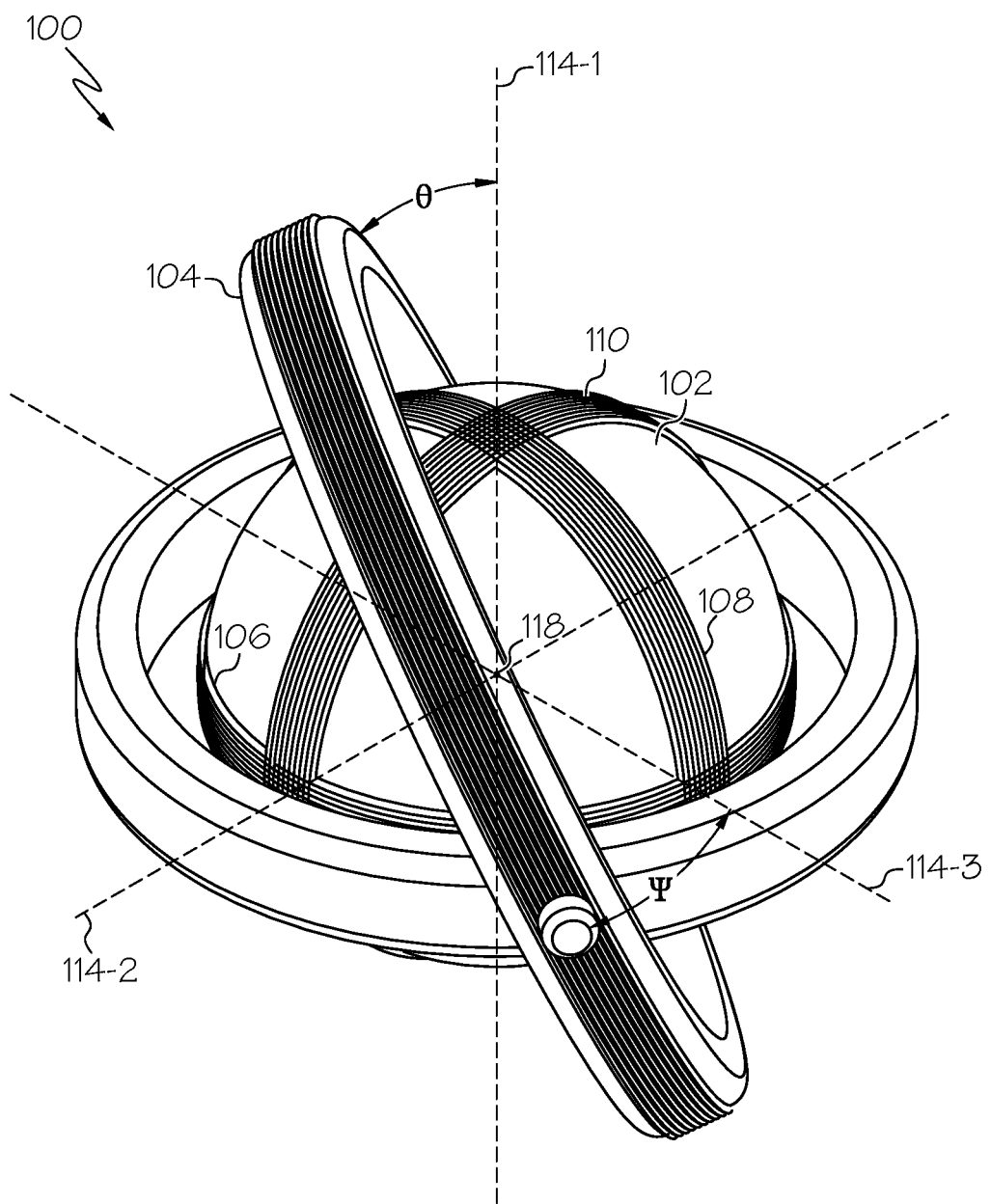
Figure 5A:
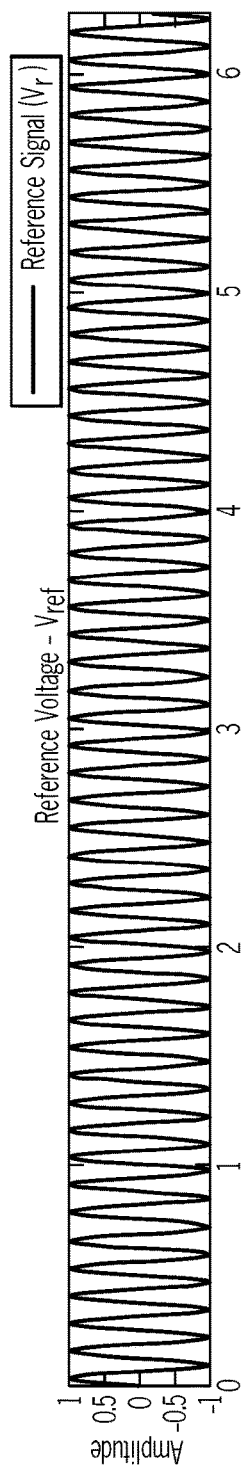
Figure 5B:
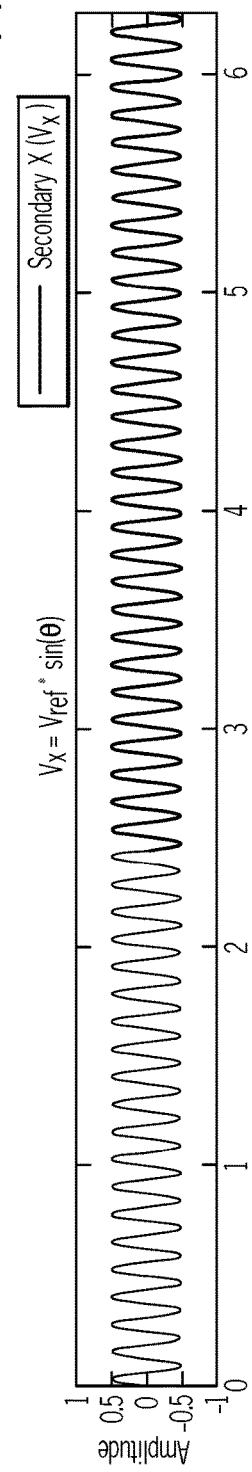
Figure 5C:
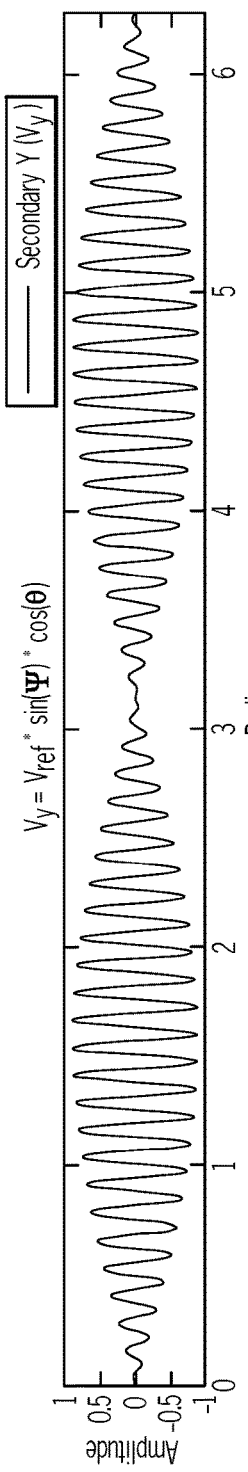
Figure 5D:
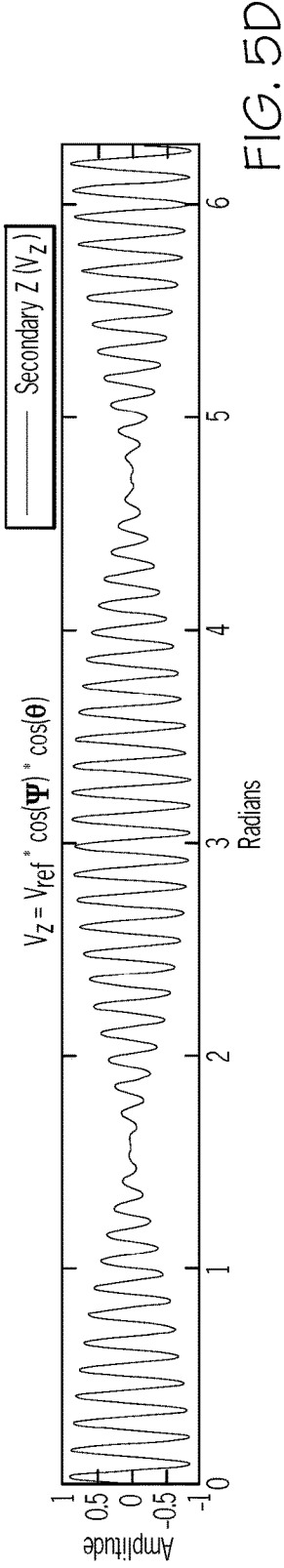

Referring now to FIGS. 2 and 3, it is seen that the first, second, and third axes of symmetry 114 intersect at an origin 118, and that the outer body 104 is moveable to a sensor position having one or both of a polar angle (θ) component relative to the origin 118 and an azimuthal angle (φ) component relative to the origin 118. More specifically, as FIGS. 2 and 3 depict, rotation of the outer body 104 about the third axis of symmetry 114-3 is representative of the polar angle (θ) component, and as FIG. 3 depicts, rotation of the outer body 104 about the first axis of symmetry 114-1 is representative of the azimuthal angle (φ) component.

From the above, it may thus be appreciated that the first sensor signal ($V_x$), the second sensor signal ($V_y$), and the third sensor signal ($V_z$) are related to the reference signal ($V_r$) as follows:

$$V_x = V_r * \sin(\theta),$$

$$V_y = V_r * \sin(\varphi) * \cos(\theta), \text{ and}$$

$$V_z = V_r * \cos(\varphi) * \cos(\theta).$$

Preferably, the reference signal ($V_r$) is a sinusoidal AC signal. As a result, the first, second, and third sensor signals are also sinusoidal AC signals. Some examples of the reference signal ($V_r$), the first sensor signal ($V_x$), the second sensor signal ($V_y$), and the third sensor signals ($V_z$) that are induced in the first, second, and third sensor coils 106, 108, 110, respectively, are depicted in FIGS. 4 and 5. The first, second, and third sensor signals 404, 406, 408 depicted in FIG. 4 are associated with a reference signal ($V_r$) 402 of 50 Hz, with the outer body 104 being positioned at a polar angle (θ) of 0-degrees (0 rad) (see FIG. 1), while the outer body 104 is rotated about the first rotational axis 114-1 from 0 to 360-degrees (0 to 2π rad). That is, the azimuthal angle (φ) is varied from 0 to 360-degrees (0 to 2π rad). The first, second, and third sensor signals 504, 506, 508 depicted in FIG. 5 are also associated with a reference signal ($V_r$) 502 of 50 Hz, but with the outer body 104 being positioned at a polar angle (θ) of 30-degrees $$\left(\frac{\pi}{6}, \text{rad}\right)$$

(see FIG. 2), while the outer body 104 is also rotated about the first rotational axis 114-1 from 0 to 360-degrees (0 to 2π rad). That is, the azimuthal angle (φ) is varied from 0 to 360-degrees (0 to 2π rad).

It may further be appreciated that the polar angle (θ) component and the azimuthal angle (φ) component of the sensor position may be derived from the first sensor signal ($V_x$), the second sensor signal ($V_y$), and the third sensor signal ($V_z$) as follows:

$$\theta = \sin^{-1} \frac{V_x}{\sqrt{V_x^2 + V_y^2 + V_z^2}}, \text{ and } \varphi = \tan^{-1} \frac{V_y}{V_z}.$$

Figure 6:
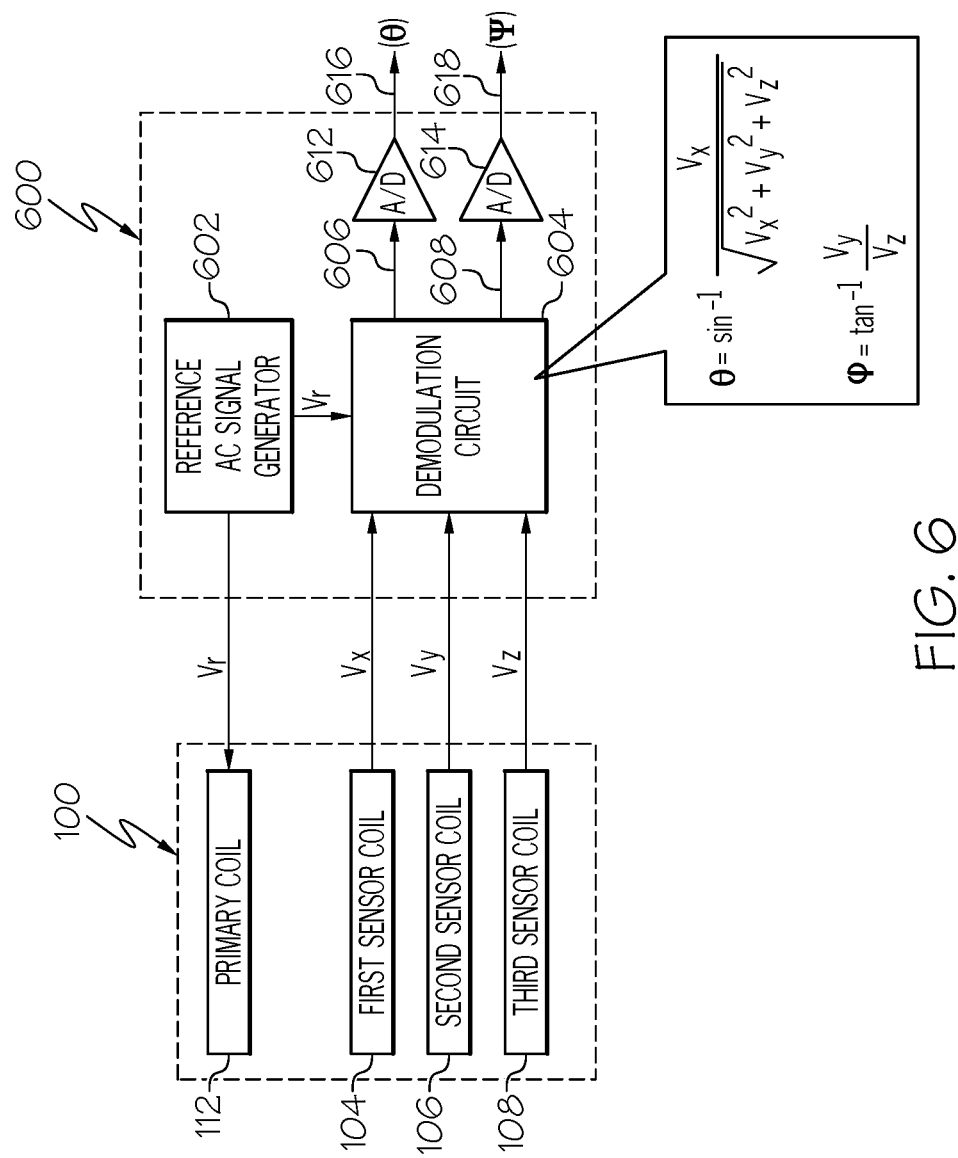
FIG. 6 depicts one embodiment of a spherical resolver system, which includes the spherical resolver of FIG. 1 and a circuit coupled to the spherical resolver of FIG. 1.

To facilitate the excitation of the primary coil 112 with the reference signal ($V_r$), and to also facilitate the derivation of the polar angle ($\theta$) component and the azimuthal angle ($\varphi$) component of the sensor position from the first ($V_x$), second ($V_y$), and third sensor signals ($V_z$), a circuit is coupled to the spherical resolver 100. The circuit 600, which is depicted in FIG. 6, is electrically coupled to the primary coil 112 and is operable to supply the AC reference signal ($V_r$) thereto. To do so, at least in the depicted embodiment, the circuit 600 includes a reference AC signal generator 602 that is configured to generate and supply the reference signal ($V_r$) to the primary coil 112. As FIG. 6 further depicts, the circuit 600 is also electrically coupled to the first, second, and third sensor coils 106, 108, 110, and thus receives the selectively induced first, second, and third sensor signals ($V_x$, $V_y$, $V_z$). More specifically, the circuit 600, at least in the depicted embodiment, includes a demodulation circuit 604 that is configured to demodulate the first, second, and third sensor signals ($V_x$, $V_y$, $V_z$) and supply one or more signals representative of the sensor position. More specifically, it supplies an analog signal 606 representative of the polar angle ($\theta$) component of the sensor position and an analog signal 608 representative of the azimuthal angle ($\varphi$) component of the sensor position. In the depicted embodiment, these signals 606, 608 are supplied to analog-to-digital converters (ADC) 612, 614, respectively, to convert the analog signals 606, 608 to digital signals 616, 618, respectively. Together, the spherical resolver 100 and circuit 600 are referred to herein as a spherical resolver system.

In the embodiment depicted in FIGS. 1-6, the spherical resolver 100 included one primary coil 112. In other embodiments, however, it will be appreciated that the spherical resolver may be implemented with two or more primary coils. In such embodiments, primary coil 112 is referred to as a first primary coil, and the additional coils may be referred to as second, third, fourth, etc., primary coils. One embodiment, which is depicted schematically in FIG. 7, the spherical resolver system includes two primary coils—the first primary coil 112 and a second primary coil 702—and both primary coils 112, 702 are wound on the outer body 104.

One of the advantages of including the second (or more) primary coils 702 is that it provides redundancy for the first primary coil 112. In any case, in such embodiments, the reference AC signal generator 602 is configured to supply two AC reference signals—a first reference AC signal ($V_{r1}$) and a second AC reference signal ($V_{r2}$). The first AC reference signal ($V_{r1}$) is supplied to the first primary coil 112 and the second AC reference signal ($V_{r2}$) is supplied to the second primary coil 702. Preferably, the first and second AC reference signals ($V_{r1}$, $V_{r2}$) are supplied at different frequencies. That is, the first reference AC signal ($V_{r1}$) is supplied at a first frequency, the second reference AC signal ($V_{r2}$) is supplied at a second frequency that is unequal to the second frequency. Although the first and second frequencies may vary, in one embodiment, the first frequency is 100 Hz and the second frequency is 200 Hz.

As may be appreciated, when the first and second AC reference signals ($V_{r1}$, $V_{r2}$) are supplied to the first and second primary coils 112, 702, the first, second, and third sensor signals are mixed sinusoidal signals. Some examples of the first and second AC reference signals ($V_{r1}$, $V_{r2}$), the first sensor signal ($V_x$), the second sensor signal ($V_y$), and the third sensor signals ($V_z$) that are induced in the first, second, and third sensor coils 106, 108, 110, respectively, is depicted in FIG. 8. The first, second, and third sensor signals 804, 806, 808 depicted in FIG. 8 are associated with mixed reference signals ($V_{r1}$, $V_{r2}$) 802 of 100 and 200 Hz, with the outer body 104 being positioned at a polar angle ($\theta$) of 30-degrees $$\left(\frac{\pi}{6}, \text{rad}\right)$$

(see FIG. 2), while the outer body 104 is also rotated about the first rotational axis 114-1 from 0 to 360-degrees (0 to $2\pi$ rad). That is, the azimuthal angle ($\varphi$) is varied from 0 to 360-degrees (0 to $2\pi$ rad).

Figure 7:
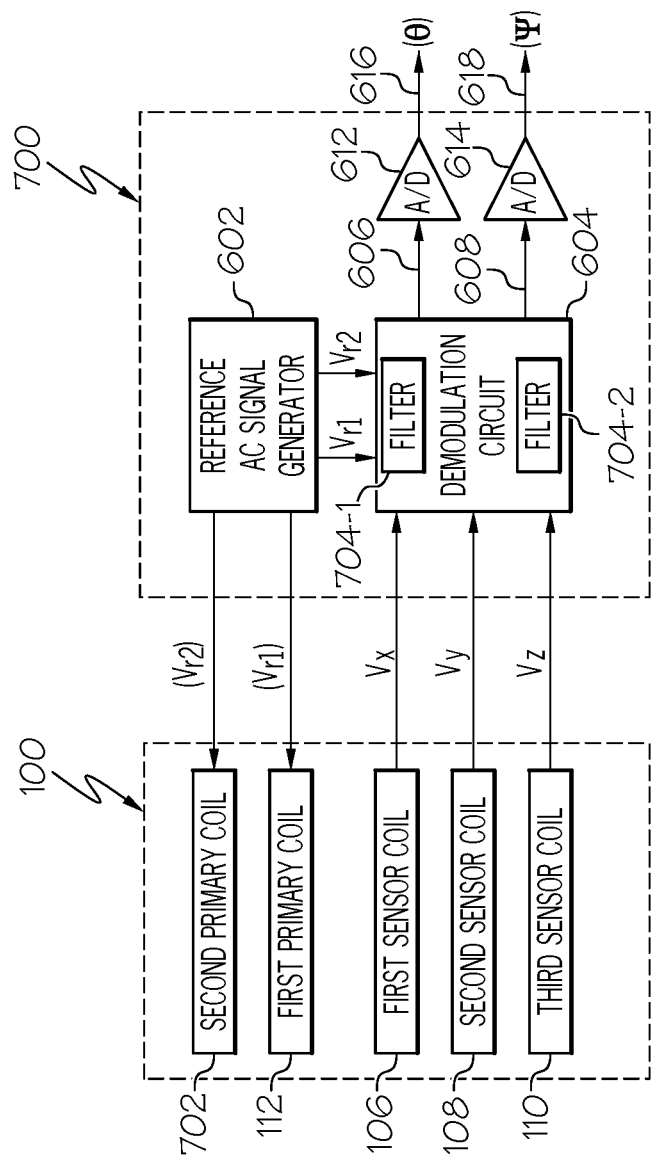
FIG. 7 depicts another embodiment of a spherical resolver system, which includes another embodiment of a spherical resolver and another embodiment of a circuit coupled to the spherical resolver.
Figure 9A:
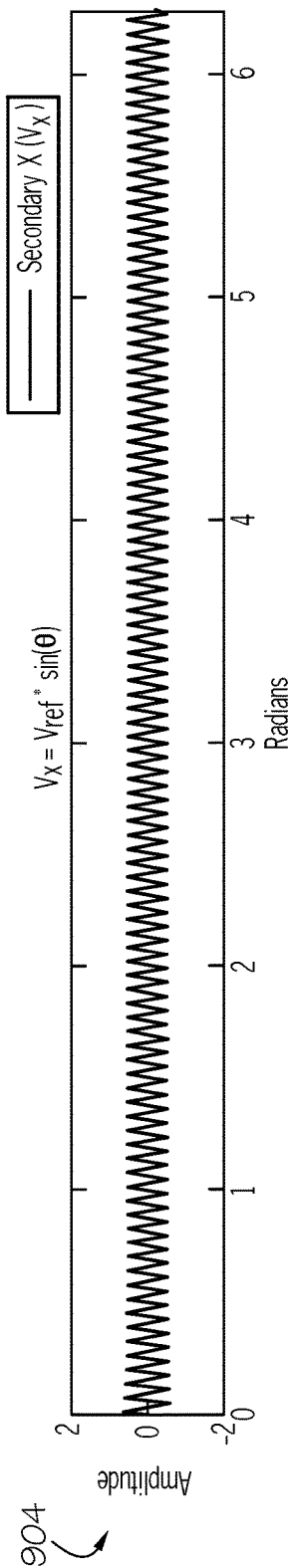
Figure 9B:
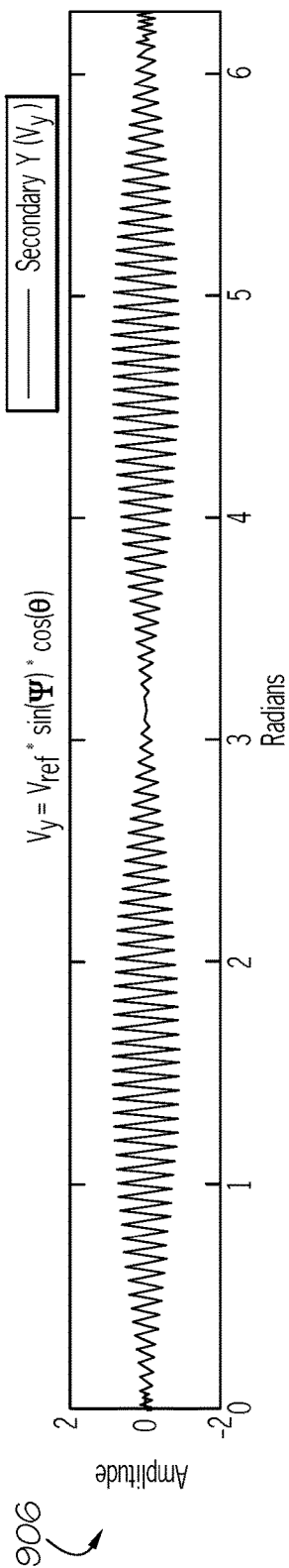
Figure 9C:
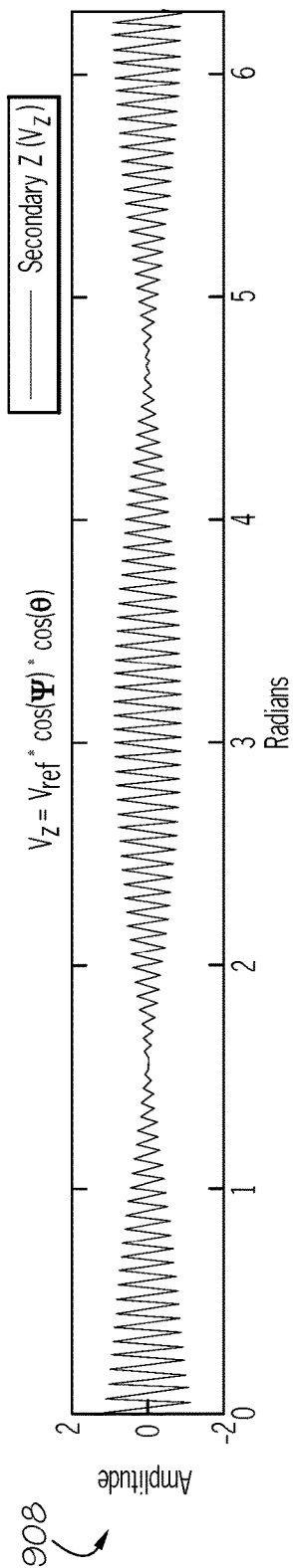
Figure 10A:
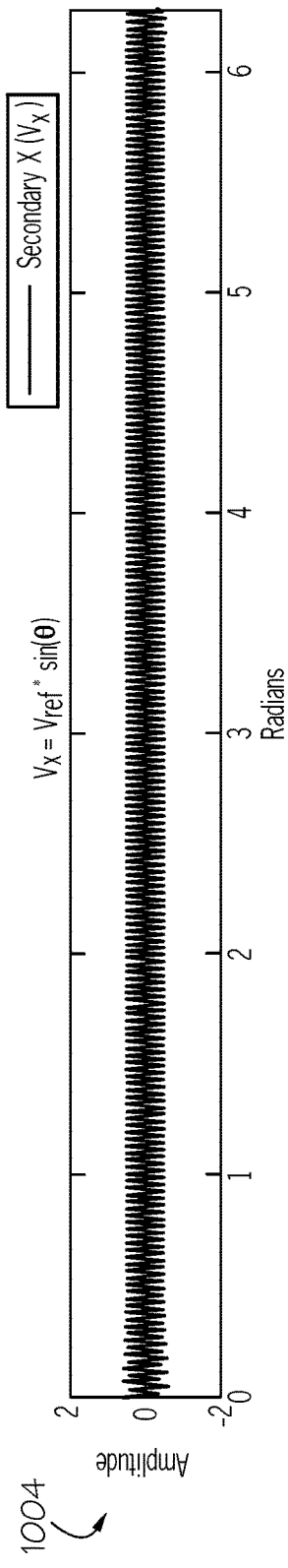
Figure 10B:
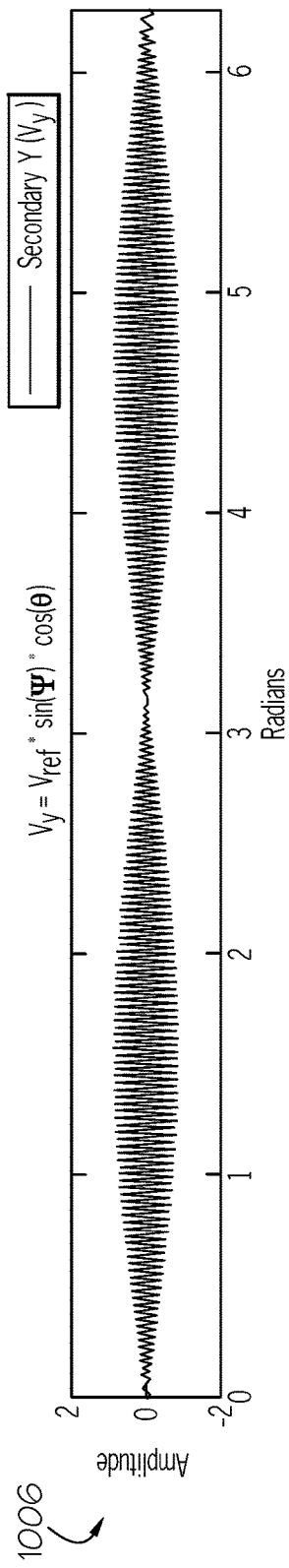
Figure 10C:
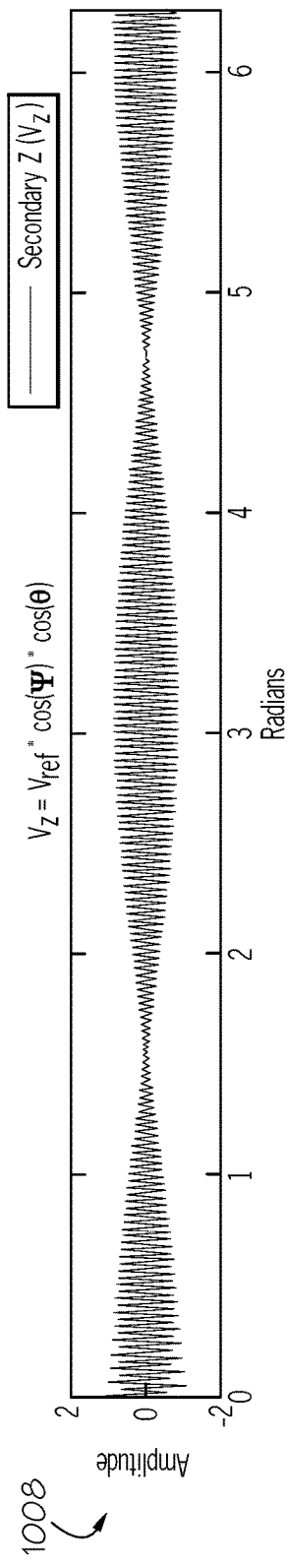

As FIG. 7 depicts, the circuit 700 associated with the embodiment in which the spherical resolver 100 includes two primary coils 112, 702, includes the same circuitry as the circuit 600 depicted in FIG. 6 except, as noted above, that reference AC signal generator 602 generates two AC reference signals. In addition, the demodulation circuit 604 may include two filter circuits 704—a first filter circuit 704-1 and a second filter circuit 704-2. The filter circuits 704, if included, can be used to filter out one of the frequencies from the first, second, and third sensor signals ($V_x$, $V_y$, $V_z$). For example, the first filter 704-1 can be used to filter out the second AC reference signal ($V_{r2}$) and the second filter 704-2 can be used to filter out the first AC reference signal ($V_{r1}$). The first, second, and third sensor signals 904, 906, 908 depicted in FIG. 9 reflect the first filter 704-1 filtering out the second AC reference signal ($V_{r2}$), and first, second, and third sensor signals 1004, 1006, 1008 depicted in FIG. 10 reflect the second filter 704-2 filtering out the first AC reference signal ($V_{r1}$).

Figure 11:
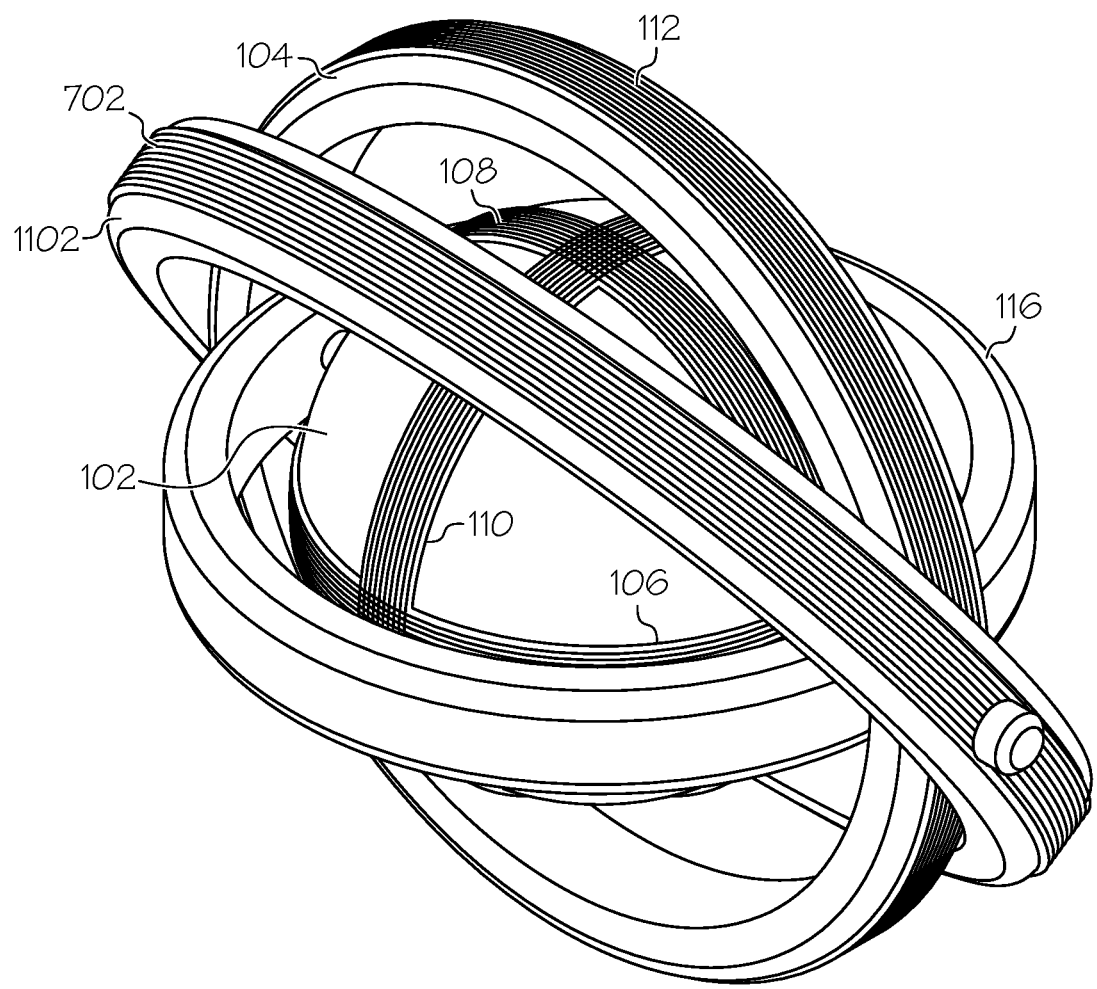
FIG. 11 depicts another embodiment of a spherical resolver.
Figure 12:
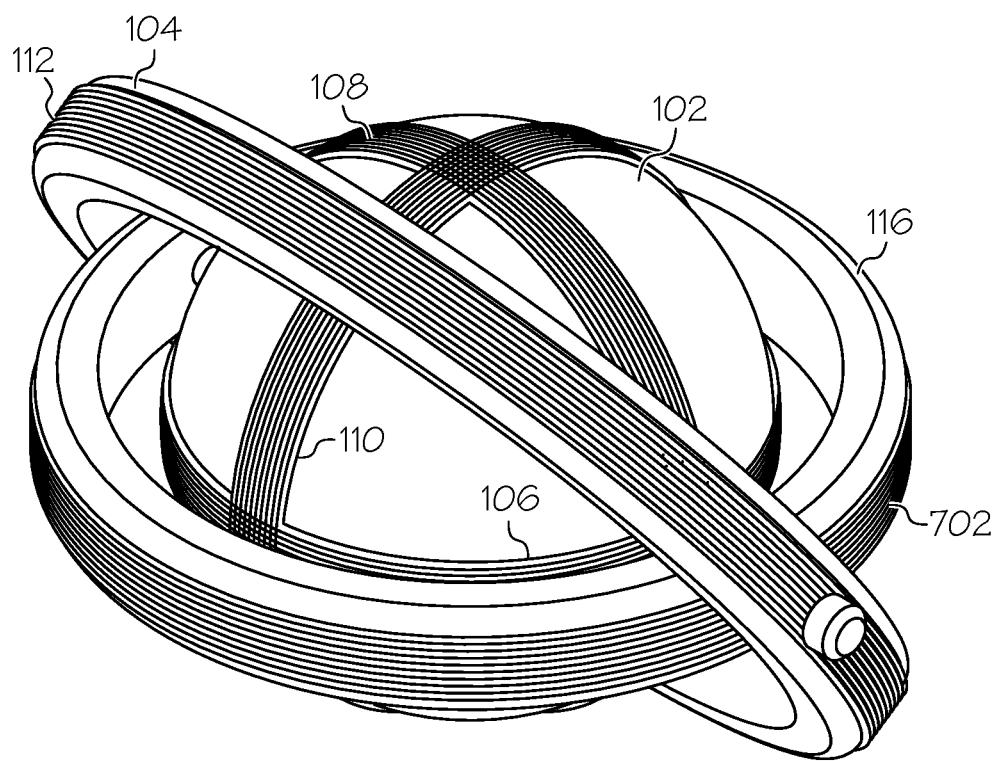
FIG. 12 depicts yet another embodiment of a spherical resolver.

It should be noted that in some embodiments the second primary coil 702 may not be wound on the same outer body 104 as the first primary coil 112. For example, as depicted in FIG. 11, it may instead be wound on a second outer body 1102 that is either rotatable with, or independently of, outer body 104. In yet another embodiment, which is depicted in FIG. 12, the second primary coil 702 may be wound on the gimbal structure 116.

The embodiments described above are implemented such that the signals representative of sensor position are representative of one or more Euler angles (e.g., $\theta$, $\varphi$). In other embodiments, the signals could instead be representative of one or more quaternions. As is generally known, quaternions are generalized complex numbers that describe three-dimensional rotations, and the mathematical conversion of Euler angles to quaternions is a fairly straightforward mathematical conversion. The advantages of using quaternion representations include creation of relationship between two reference frames irrespective of any rotational sequences. It also removes the possibilities of mathematical singularities, which can occur with Euler Angles.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A spherical resolver system, comprising:
   a spherical body having a first axis of symmetry, a second axis of symmetry, a third axis of symmetry, the first, second, and third axes of symmetry disposed perpendicular to each other;
   an outer body spaced apart from, and surrounding a portion of, the spherical body, wherein one of the spherical body or the outer body is rotatable, relative to the other, about the first, second, and third axes of symmetry, and thereby moveable to a sensor position;
   a first sensor coil wound on a portion of the spherical body about the first axis of symmetry;
   a second sensor coil wound on a portion of the spherical body about the second axis of symmetry;
   a third sensor coil wound on a portion of the spherical body about the third axis of symmetry;
   a first primary coil wound on the outer body; and
   a circuit coupled to the first primary coil and operable to supply a first alternating current (AC) reference signal ($V_{r1}$) to the first primary coil, whereby a first sensor signal ($V_x$) is selectively induced in the first sensor coil, a second sensor signal ($V_y$) is selectively induced in the second sensor coil, and a third sensor signal ($V_z$) is selectively induced in the third sensor coil, the circuit further coupled to receive the selectively induced first, second, and third sensor signals and configured, upon receipt of the selectively induced first, second, and third sensor signals, to supply one or more signals representative of the sensor position.

2. The system of claim 1, further comprising:
   a gimbal structure spaced apart from, and surrounding a portion of, the spherical body, the gimbal rotationally coupled to the outer body to allow rotation of the outer body.

3. The system of claim 1, wherein the signals representative of sensor position are signals representative of one or more Euler angles.

4. The system of claim 1, wherein:
   the first, second, and third axes of symmetry intersect at an origin; and
   the one of the spherical body or the outer body is moveable to a sensor position having one or both of (i) a polar angle ($\theta$) component relative to the origin and (ii) an azimuthal angle ($\varphi$) component relative to the origin.

5. The system of claim 4, wherein:

$V_x = V_{r1} * \sin(\theta)$, $V_y = V_{r1} * \sin(\varphi) * \cos(\theta)$, and $V_z = V_{r1} * \cos(\varphi) * \cos(\theta)$.

6. The system of claim 5, wherein the circuit is configured to determine the polar angle ($\theta$) component and the azimuthal angle ($\varphi$) component of the sensor position as follows:

$$\varphi = \tan^{-1}\frac{V_y}{V_z}, \theta = \sin^{-1}\frac{V_x}{\sqrt{V_x^2 + V_y^2 + V_z^2}}.$$

7. The system of claim 1, further comprising:
   a second primary coil wound on the outer body, wherein the circuit is further operable to (i) supply a second AC reference signal ($V_{r2}$) to the second primary coil and (ii) supply one or more second signals representative of the sensor position.

8. The system of claim 1, wherein:
   the first reference AC signal ($V_{r1}$) is supplied at a first frequency;
   the second reference AC signal ($V_{r2}$) is supplied at a second frequency; and
   the first frequency is unequal to the second frequency.

9. The system of claim 1, wherein the signals representative of sensor position are signals representative of one or more quaternions.

10. A spherical resolver system, comprising:
    a spherical body having a first axis of symmetry, a second axis of symmetry, a third axis of symmetry, the first, second, and third axes of symmetry disposed perpendicular to each other;
    an outer body spaced apart from, and surrounding a portion of, the spherical body, wherein one of the spherical body or the outer body is rotatable, relative to the other, about the first, second, and third axes of symmetry, and thereby moveable to a sensor position;
    a first sensor coil wound on a portion of the spherical body about the first axis of symmetry;
    a second sensor coil wound on a portion of the spherical body about the second axis of symmetry;
    a third sensor coil wound on a portion of the spherical body about the third axis of symmetry;
    a first primary coil wound on the outer body;
    a gimbal structure spaced apart from, and surrounding a portion of, the spherical body, the gimbal rotationally coupled to the outer body to allow rotation of the outer body;
    and
    a circuit coupled to the first primary coil and operable to supply a first alternating current (AC) reference signal ($V_{r1}$) to the first primary coil, whereby a first sensor signal ($V_x$) is selectively induced in the first sensor coil, a second sensor signal ($V_y$) is selectively induced in the second sensor coil, and a third sensor signal ($V_z$) is selectively induced in the third sensor coil, the circuit further coupled to receive the selectively induced first, second, and third sensor signals and configured, upon receipt of the selectively induced first, second, and third sensor signals, to supply one or more signals representative of the sensor position, wherein:
- the first, second, and third axes of symmetry intersect at an origin, and
- the one of the spherical body or the outer body is moveable to a sensor position having one or both of (i) a polar angle (θ) component relative to the origin and (ii) an azimuthal angle (φ) component relative to the origin.

11. The system of claim 1, wherein the signals representative of sensor position are signals representative of one or more Euler angles.

12. The system of claim 10, wherein:

$$V_x = V_{r1} * \sin(\theta),$$

$$V_y = V_{r1} * \sin(\varphi) * \cos(\theta), \text{ and}$$

$$V_z = V_{r1} * \cos(\varphi) * \cos(\theta).$$

13. The system of claim 12, wherein the circuit is configured to determine the polar angle (θ) component and the azimuthal angle (φ) component of the sensor position as follows:

$$\varphi = \tan^{-1} \frac{V_y}{V_z}, \theta = \sin^{-1} \frac{V_x}{\sqrt{V_x^2 + V_y^2 + V_z^2}}.$$

14. The system of claim 10, further comprising:
a second primary coil wound on the outer body, wherein the circuit is further operable to (i) supply a second AC reference signal ($V_{r2}$) to the second primary coil and (ii) supply one or more second signals representative of the sensor position.

15. The system of claim 10, wherein:
the first reference AC signal ($V_{r1}$) is supplied at a first frequency;
the second reference AC signal ($V_{r2}$) is supplied at a second frequency; and
the first frequency is unequal to the second frequency.

16. The system of claim 10, wherein the signals representative of sensor position are signals representative of one or more quaternions.

* * * * *